United States Patent
Mo et al.

(10) Patent No.: US 9,500,895 B2
(45) Date of Patent: Nov. 22, 2016

(54) LCD TOUCH SCREEN AND APPLICATIONS INTEGRATING SINGLE LAYER CAPACITIVE SENSOR

(71) Applicant: FocalTech Systems, Ltd., Grand Cayman (KY)

(72) Inventors: Michael Mo, Shenzhen (CN); Hua Li, Shenzhen (CN)

(73) Assignee: FocalTech Systems, Ltd., Grand Cayman (KY)

( * ) Notice: Subject to any disclaimer, the term of this patent is extended or adjusted under 35 U.S.C. 154(b) by 114 days.

(21) Appl. No.: 14/037,785

(22) Filed: Sep. 26, 2013

(65) Prior Publication Data

US 2014/0098305 A1    Apr. 10, 2014

(30) Foreign Application Priority Data

Sep. 26, 2012    (CN) .......................... 2012 1 0365027

(51) Int. Cl.
*G02F 1/1333*    (2006.01)
*G02F 1/1335*    (2006.01)
*G06F 3/041*    (2006.01)
*G06F 3/044*    (2006.01)

(52) U.S. Cl.
CPC ..... *G02F 1/13338* (2013.01); *G02F 1/133512* (2013.01); *G06F 3/044* (2013.01); *G06F 3/0412* (2013.01); *G06F 2203/04103* (2013.01); *G06F 2203/04107* (2013.01)

(58) Field of Classification Search
CPC ..................... G02F 1/13338; G02F 1/133528; G02F 1/136213; G02F 2001/133565; G02F 1/133512; G02F 1/133514; G02F 1/134363; G06F 3/0412; G06F 3/044; G06F 3/0421; G06F 2203/04112; G06F 3/0416
See application file for complete search history.

(56) References Cited

U.S. PATENT DOCUMENTS

| | | | |
|---|---|---|---|
| 2012/0319966 A1* | 12/2012 | Reynolds | G06F 3/041 345/173 |
| 2013/0112542 A1* | 5/2013 | Wang | G06F 3/0412 200/600 |
| 2013/0335376 A1* | 12/2013 | Lee | G06F 3/0416 345/174 |

* cited by examiner

*Primary Examiner* — Huyen Ngo
(74) *Attorney, Agent, or Firm* — Westman, Champlin & Koehler, P.A.

(57) ABSTRACT

It relates to an LCD touch screen and applications integrating single layer capacitive sensor, comprising first underlayer, second underlayer, liquid crystal imaging material and control circuit. It also comprises capacitive touch sensor, which comprises an electrode layer set between the said first underlayer and second underlayer. The said electrode layer comprises electrodes and electrode conductors which are used for electric connection of various electrodes; both of the said electrodes and electrode conductors are set in the same plane. In the invention, the single layer capacitive sensor is set inside of the LCD touch screen, so as to reduce the thickness of the LCD touch screen, conforming to the development tendency of LCD touch screen to thin even ultra-thin ones. In addition, the invention has taken advantage of shielding effect of the black matrix, at the same time of shielding pixel electrode matrix, electrodes and the electrode conductors for the capacitive sensor are also shielded, thus, using effect of the capacitive touch sensor has been enhanced and manufacturing cost is reduced.

13 Claims, 14 Drawing Sheets

LCD TOUCH SCREEN AND APPLICATIONS INTEGRATING SINGLE LAYER CAPACITIVE SENSOR

The present application claim priority of Chinese patent application Serial No. 201210365027.1, filed Sep. 26, 2012, the content of which is hereby incorporated by reference in its entirely.

TECHNICAL FIELD

The invention relates to the display screen which is carried with touch sensor, especially LCD touch screen in which capacitive sensor is integrated.

BACKGROUND ART

LCD touch screen of the prior art as is shown in FIG. 25 and FIG. 28 comprises the first underlayer 71a, the second underlayer 72a and liquid crystal imaging material 73a which is set between the first underlayer 71a and the second underlayer 72a. As is shown in FIG. 26, pixel electrodes 7231a which are used for controlling reversal of liquid crystal imaging material 73a are set on the said second underlayer 72a, and the said pixel electrodes 7231a are laid by matrix structure to form pixel electrode matrix 723a. Pixel electrode drive circuits 7232a are set around each pixel electrode 7231a. The said pixel electrode drive circuits 7232a are used for applying drive signals to a pixel electrode 7231a, so as to enable liquid crystal imaging material which is over against the pixel electrodes 7231a to be turned over by the pixel electrodes 7231a. Color filter 711a is set on the said first underlayer 71a. Two polaroids are respectively set at the respective outer side surfaces of the underlayer 71a and 72a. As a rule, the first underlayer 71a which is set with color filter 711a is served as the upper surface of the LCD, namely, the first underlayer 71a of the two underlayers is set at the side which is close to users. The second underlayer 72a which is set with pixel electrode matrix 723a is served as lower surface of the LCD, namely, the second underlayer 72a of the two underlayers is set at the side which is far away from users. Backlight of the LCD shall also be set under the said second underlayer 72a. The said pixel electrodes 7231a can be made of transparent conductive material, for instance Indium Tin Oxide which is ITO for short. Common potential electrode layer 76a providing common potential is also set inside of the said LCD. To ensure that there is low electrical resistively for the drive circuit, the said pixel electrode drive circuits 7232a are made of metal conductive material. To prevent users to see pixel electrode drive circuits 7232a on the said pixel electrode matrix 723a, black matrix 75a which is made of light proof and anti-glare material is also set on the said color filter 711a. As is shown in FIG. 27, black matrix 75a comprises masking tapes 751a, and all orthographic projections on the pixel electrode matrix 723a for the said masking tapes 751a fall on all pixel electrode drive circuits 7232a, thus, pixel electrode drive circuits 7232a are invisible by virtue of masking tapes 751a. Therefore, structure of the said black matrix 75a is related to the layout of the pixel electrode driving circuits 7232a. Because pixel electrode driving circuits 7232a are arranged at the void areas between various pixel electrodes 7231a, the said black matrix 75a form reticular structure constituted by masking tapes 751a. In FIG. 27, the dash area is the area where masking tapes 751a lie, for the purpose of stopping users to see pixel electrode driving circuits 7232a under black matrix 75a. The void part is enclosed by masking tapes 751a, so imaging for each pixel is displayed from the void part. Thus, images of all pixels inside of the LCD display area form a complete image. In both FIG. 25 and FIG. 28, black matrix 75a and color filter 711a are divided into two layers theoretically before being displayed. For actual products, color filter 711a can be set in the void area in the said black matrix 75a, thus black matrix 75a and color filter 711a are combined into one layer.

LCD of the prior art comprises twisted nematic LCD, which is TN LCD for short, as well as In-Plane Switching LCD, IPS LCD for short. To the invention, main distinctions between the two are that, for TN LCD as is shown in FIG. 25, the said common potential electrode layer 76a is set on the surface which is over against the pixel electrode matrix 723a, namely on the first underlayer 71a, the said common potential electrode layer 76a can be simply made into a conductive electrode plane with ITO material, electric field which is over against the electrode plates is established between the common potential electrode layer 76a and the various pixel electrodes 7231a of the pixel electrode matrix 723a; for IPS LCD as is shown in FIG. 28, the said common potential electrode layer 76a is set on the same plane with pixel electrode matrix 723a, namely on the second underlayer 72a, then, electrode plane for the said common potential electrode layer 76a shall be over against the void areas between various pixel electrodes 7231a, namely over against the various pixel electrode drive circuits 7232a, thus, the common potential electrode layer 76a is the common potential plate electrode which is made of ITO strip electrodes similar to reticular structure of black matrix 75a, and electric field which is adjacent to the plate electrode is established between the common potential electrode layer 76a and various pixel electrodes 7231a of the pixel electrode matrix 723a.

For the scheme of the prior art combining capacitive touch sensor and display screen, a part of which is that overlap capacitive touch sensor at the outside of any type of touch screen. To enable the display screen to be thinner, fitted with LCD, the other part of the prior art is that the capacitive touch sensor is integrated on the LCD, namely LCD touch screen. The said touch LCD has already become the future development tendency. An approach for the integration of LCD with touch sensor is that touch sensor is made on the first underlayer of the LCD, one of the structure is that set the whole touch sensor on the first underlayer 71a, which in material is the method of stacking at the outside of the display screen; the other structure is that set plate electrode at both sides of the first underlayer 71a taking the first underlayer 71a as the insulating medium. Because all first underlayers 71a for the LCD are required to reach the effect of thin display screen after thinning process, while thinning process fails to be reached after touch sensor is integrated, thus, the touch LCD with such integration method fails to reach the effect of thin display screen, even if the thin type display screen effect can be realized, high manufacturing cost shall be paid, which is unfit for volume production. Approach for the integration of LCD with touch sensor for the other kind of LCD is that set the touch sensor in the LCD. Without prejudice to the image of LCD screen, touch sensor of the said existing technology is totally made of transparent conductive material such as ITO material. To avoid high resistivity caused by too close distance between the two layers of electrodes made of transparent conductive material, thus affecting effect of sensing, single layer capacitive touch sensors structure can't be used in the touch sensor, while the adoption of two layers of capacitive sensor structure requires certain distance maintained by two layers of electrodes. One structure is set touch sensor into the LCD as a whole. Because space shall be maintained between the two layers of electrodes, thickness of the LCD will be increased, failing to conform to the development tendency of the LCD to thin even ultra-thin ones. Another structure is that two layers of electrodes are respectively set at both sides of the liquid crystal imaging material 73a, then, one layer of electrodes must be set on the second underlayer 72a which is already set with pixel electrode matrix 723a. Since very sophisticated technological level is required for the pixel electrodes 7231a and pixel electrode drive circuits 7232a which are set on the second underlayer 72a (intensive and arranged as matrix), a layer of touch sensor electrodes processed thereupon will impose more strict process requirement, thus, low processing yield is easily to be caused, which has greatly increased the manufacturing cost for the LCD.

To sum up, there is no solution which can meet the thin touch LCD tendency under the condition of low cost and no increase of process requirements.

CONTENT OF THE INVENTION

In view of the above-described problems, the aim of the invention are to avoid defects in the prior art and to provide an LCD touch screen integrating single layer capacitive sensor, and design touch LCD conforming to thinning tendency under the condition of low cost and no increase of process demand by means of avoiding the deficiencies of the prior art.

The purpose of the invention is achieved by the following technical schemes:

Design and manufacture an LCD touch screen integrating single layer capacitive sensor, comprising first underlayer, second underlayer, liquid crystal imaging material which is set between the first underlayer and second underlayer as well as control circuit. Color filter is set on the said first underlayer. Pixel electrode matrix is set on the said second underlayer, which comprises pixel electrodes which are distributed as matrix, and each pixel electrode is provided with pixel electrode driving circuit, in particular, it also comprises capacitive touch sensor, and the capacitive touch sensor comprises the electrode layer which is set between the first underlayer and second underlayer. The said electrode layer comprises electrodes and electrode conductors which are for electric connection of various electrodes; and both of the said electrodes and electrode conductors are set in the same plane.

As to the scheme for the setting of a capacitive sensor, a layer of black matrix masking all pixel electrode drive circuits of the pixel electrode matrix is set on the said first underlayer. The black matrix comprises masking tapes. The said electrode layer is set at the first underlayer, and covered by the said black matrix, and all orthographic projections on the black matrix for electrodes and electrode conductors inside of the electrode layer fall on the masking tapes of the black matrix.

As to scheme for the setting of the other kind of capacitive sensor, the black matrix is replaced by capacitive sensor; electrodes and electrode conductors inside of the said electrode layer are made of conductive material which is non-transparent and non-reflective on the surface. All orthographic projections on the plane where pixel electrode matrix is located for the said electrodes and electrode conductors fall on all pixel electrode driving circuits of the pixel electrode matrix, thus, all pixel electrode driving circuits of the pixel electrode matrix can be shielded by the electrode layer.

As to scheme for the setting of another kind of capacitive sensor, common potential electrode layer providing common potential in set on the said first underlayer or second underlayer. Electrode layer of the said capacitive touch sensor is set close to the said common potential electrode layer, and all orthographic projections on the said common potential electrode layer for the electrodes and electrode conductors inside of the electrode layer fall in the common potential electrode layer.

Specifically, the said common potential electrode layer comprises at least one common potential electrode, then, all orthographic projections on the said common potential electrode layer for the electrodes and electrode conductors in the said electrode layer fall into the common potential electrodes.

For layout scheme of one kind of capacitive sensor, the said capacitive touch sensor is based on the principle of mutual capacitance, the said electrode comprises first electrodes and second electrodes which are made of conductive material, the said electrode conductor comprises first connecting conductors which are made of conductive material and electrically connected to the first electrodes and second connecting conductors which are electrically connected to the second electrodes. Any of the said first electrodes and second electrodes are placed in the display touch region of the said LCD touch screen without overlapping each other; there is no positional relation of crossover, spanning and intersection between the first connecting conductors of the respective first electrodes, the second connecting conductors of the respective second electrodes, and between any of the first connecting conductors and second connecting conductors in the display touch region of the LCD touch screen.

For a concrete structure, the said first electrodes are equivalent to the first equivalent electrodes, the said second electrodes are equivalent to the second equivalent electrodes, the said first connecting conductors are equivalent to the first equivalent connecting conductors, and the said second connecting conductors are equivalent to the second equivalent connecting conductors. The said first equivalent electrodes are electrically connected to be at least two first equivalent electrode chains in serial by groups by virtue of the first equivalent connecting conductors, respective centre lines of which are parallel to each other; and centre lines of the said first equivalent electrode chains are lines connecting centroids of respective first equivalent electrode consisting the first equivalent electrode chains. The said second equivalent electrodes are set between the two adjacent first equivalent electrode chains and/or at the respective outside of the two most lateral first equivalent electrode chains; second equivalent connecting conductors electrically connecting respective second equivalent electrodes are set parallel to each other in the display touch region of the said LCD touch screen.

For the other concrete structure, the said first electrodes are equivalent to the first equivalent electrodes, the said second electrodes are equivalent to the second equivalent electrodes, the said first connecting conductors are equivalent to the first equivalent connecting conductors, and the said second connecting conductors are equivalent to the second equivalent connecting conductors. The said first equivalent electrodes are electrically connected to be at least two first equivalent electrode chains in serial by groups by virtue of the first equivalent connecting conductors, respective centre lines of which are parallel to each other; and centre lines of the said first equivalent electrode chains are lines connecting centroids of respective first equivalent electrode consisting the first equivalent electrode chains. The said first equivalent electrodes are provided with hollow equivalent electrode accommodating areas, and at least one equivalent wire slot is set for the first equivalent electrodes, by virtue of the wire slots, areas where equivalent electrode accommodating areas are located in the said first equivalent electrodes are connected with the areas at the outside of the first equivalent electrodes. The said second equivalent electrodes are set inside of the equivalent electrode accommodating areas of the first equivalent electrodes corresponding to the second equivalent electrodes, second equivalent connecting conductors electrically connecting the said second equivalent electrodes are led out from the equivalent wire slots of the said first equivalent electrodes; and second equivalent connecting conductors electrically connecting respective second equivalent electrodes are set at the outside area of the first equivalent electrodes parallel to each other.

For the layout scheme of the above capacitive sensor, the said electrode layer also comprises dumb electrodes without any electrical connections, namely, the dumb electrodes are at electric dangling state. The said dumb electrodes are equivalent to equivalent dumb electrodes, the said equivalent dumb electrodes are set at the void areas between the first equivalent electrodes, second equivalent electrodes, as well as between the first equivalent electrodes and second equivalent electrodes.

For layout scheme of the other kind of capacitive sensor, the said capacitive touch sensor is based on the principle of mutual capacitance. The said electrode comprises the first electrodes and the second electrodes which are made of conductive material, and the said electrode conductor comprises connecting conductors of the same layer which are made of conductive material. Masking tapes of the said black matrix are made of conductive material, comprising bridging masking tapes and dumb electrode masking tapes with no electrical connection to each other. The said masking tapes for dumb electrodes are at electric dangling state. Both ends of a bridging masking tape are respectively set with two electrical connection columns reaching to the electrode layer. The said electrical connection columns are generally made of material for making electrode layer, made up at the same time of electrode layer production. Any of the said first electrodes and second electrodes are placed in the display touch region of the said LCD touch screen without overlapping each other. One kind of electrodes in the first electrodes and second electrodes are electrically connected by virtue of the connecting conductors at the same layer; while the other kind of electrodes are electrically connected by virtue of bridging masking tapes from the black matrix and two electrical connection columns.

Concretely, the said first electrodes are equivalent to the first equivalent electrodes, the said second electrodes are equivalent to the second equivalent electrodes, and the said connecting conductors of the same layer are equivalent to the equivalent connecting conductors at the same layer.

Specifically, the said dumb electrode masking tapes are separated into at least two dumb electrode blocks which are not electrically connected, dumb electrode masking tapes in the same dumb electrode blocks are electrically connected.

As is the same structure with the previous scheme, electrodes of the said electrode layer also comprises dumb electrodes that have no electrical connection relation, namely, the dumb electrodes are at electric dangling state; the said dumb electrodes are equivalent to equivalent dumb electrodes. The said dumb electrodes are set at void areas between the first equivalent electrodes, the second equivalent electrodes, and between the first equivalent electrodes and second equivalent electrodes.

For layout scheme of another kind of capacitive sensor, the said capacitive touch sensor is based on the principle of mutual capacitance, the said electrode comprise first electrodes and second electrodes which are made of conductive material, the said electrode conductor comprises first connecting conductors which are made of conductive material and electrically connected to the first electrodes and second connecting conductors which are electrically connected to the second electrodes. Any of the said first electrodes and second electrodes are placed in the display touch region of the said LCD touch screen without overlapping each other. Cross section parts between the first connecting conductors, the second connecting conductors, and between any first connecting conductors and second connecting conductors enable the first electrodes and second electrodes fail to be electrically connected by means of wire overhead structure or setting separation medium.

Specifically, the said first electrodes are equivalent to the first equivalent electrodes, the said second electrodes are equivalent to the second equivalent electrodes, the said first connecting conductors are equivalent to the first equivalent connecting conductors, and the said second connecting conductors are equivalent to the second equivalent connecting conductors. The first equivalent electrodes are electrically connected to be at least one first electrode chain in groups by virtue of first equivalent connecting conductors, and the second equivalent electrodes are electrically connected to be at least one second electrode chain in groups by virtue of second equivalent connecting conductors.

As is the same structure with the foregoing scheme, electrode of the said electrode layer also comprises dumb electrodes without any electrical connections, namely, the dumb electrodes are at electric dangling state. The said dumb electrodes are equivalent to equivalent dumb electrodes, the said equivalent dumb electrodes are set at the void areas between the first equivalent electrodes, second equivalent electrodes as well as between the first equivalent electrodes and second equivalent electrodes.

As to layout scheme for still another kind of capacitive sensor, the said capacitive touch sensor is based on the principle of self capacitance, and the said electrodes comprise the third electrodes made of conductive material. The said electrode conductors comprise third connecting conductors that are respectively electrically connected to the respective third electrodes. The said third electrodes are equivalent to the third equivalent electrodes which are of trapezoidal plane shapes, and the said third connecting conductors are equivalent to the third equivalent connecting conductors. Any two adjacent third equivalent electrodes are arranged by means that upper bottom of the third equivalent electrodes for one trapezoid is collinear with lower bottom of the third equivalent electrodes for the other trapezoid, and lower bottom of the third equivalent electrodes for one trapezoid is collinear with the upper bottom of the third equivalent electrodes for the other trapezoid, thus, enabling all third equivalent electrodes to be arranged in the display touch area of the said LCD touch screen in the form of "occlusion"; the said third connecting conductors are led out from the electrode layer in parallel.

As is the same structure with the foregoing scheme, electrodes of the said electrode layer also comprise dumb electrodes without any electrical connections, namely, the dumb electrodes are at electric dangling state. The said dumb electrodes are equivalent to equivalent dumb electrodes, and the said equivalent dumb electrodes are set at the void areas between the third equivalent electrodes.

The said LCD touch screen also comprises flexible PCB, by virtue of the flexible PCB, devices set on the said first underlayer are electrically connected to devices set on the said second underlayer.

Or, the said LCD touch screen also comprises conductive contacts set between the first underlayer and second underlayer. By virtue of the conductive contacts, devices set on the said first underlayer are electrically connected to devices set on the said second underlayer.

The said LCD touch screen also comprises two polaroids which respectively covers the first underlayer and second underlayer.

For concrete complementation scheme of one control circuit, the said control circuit comprises main control module and LCD module and touch sensor module which are electrically connected to the main control module. The said LCD module comprises LCD drive module and pixel electrode driving circuits, the said pixel electrode driving circuit comprises gate drive module and source drive module which are electrically connected to the LCD drive module respectively, as well as pixel activation module which is electrically connected to the said gate drive module and source drive module. The said touch sensor module comprises touch sensor controller module and electrode channel which is electrically connected to the touch sensor controller module; and the said electrode channel is electrically connected by electrode groups inside of the said electrode layer.

Specific locations for the said modules are: area of the said second underlayer is larger than that of the first underlayer, the second underlayer comprises display touch area which is over against the first underlayer, and the epitaxial region which is outward extended by the said display touch area. The said gate drive module, source drive module and pixel activation module are set at the display touch area of the second underlayer; the said LCD drive module and touch sensor controller module are set at the epitaxial region of the second underlayer; and the said electrode channel is set inside of the electrode layer which is on the first underlayer.

Specifically, the first underlayer is led out by the said electrode channel by virtue of the flexible PCB from the electrode layer and electrically connected to the said touch sensor controller module.

Or, the said LCD touch screen also comprises conductive contacts set between the first underlayer and second underlayer. By virtue of the conductive contacts, electrode conductors of the first underlayer led out from the electrode layer are electrically connected to the said touch sensor controller module by the said electrode channel.

For concrete complementation scheme of the other kind of control circuit, the said control circuit comprises main control module, LCD and touch sensor integration module which are electrically connected to the main control module. The said control circuit also comprises gate drive module and source drive module which are respectively electrically connected to the said LCD and touch sensor integration module, as well as the pixel activation module which is electrically connected to the said gate drive module and source drive module. The said control circuit also comprises the electrode channel which is electrically connected to the said LCD and touch sensor integration module; and the said electrode channel is electrically connected by the electrode groups inside of the said electrode layer.

Specific locations for the said modules are: area of the said second underlayer is larger than that of the first underlayer, the second underlayer comprises display touch area which is over against the first underlayer and the epitaxial region which is extended by the said display touch area outward. The said gate drive module, source drive module and pixel activation module are set at the display touch area of the second underlayer; the said LCD and touch sensor integration module is set at the epitaxial region of the second underlayer; and the said electrode channel is set inside of the electrode layer which is on the first underlayer.

Specifically, the first underlayer led out from the electrode layer is electrically connected to the said LCD and touch sensor integration module by the said electrode channel by virtue of the flexible PCB.

Or, the said LCD touch screen also comprises conductive contacts which are used for electrical connection between the first underlayer and the second underlayer; and electrode conductors of the first underlayer led out from the electrode layer are electrically connected to the said LCD and touch sensor integration module by the said electrode channel by virtue of the conductive contacts.

For concrete implementation scheme of the above control circuit, the said capacitive touch sensor is based on the principle of mutual capacitance, and the said electrode channel comprises the drive electrode channel which is electrically connected by the drive electrode groups and the sensor electrode channel which is electrically connected by the sensor electrode groups.

The purpose of the invention is also achieved by the following technical schemes:

An LCD touch screen device provided with integrated single layer capacitive sensor, comprising LCD. In particular, the said LCD is integrated with single layer capacitive sensor, comprising the first underlayer, the second underlayer, liquid crystal imaging material set between the first underlayer and second underlayer, as well as control circuit. Color filter is set on the said first underlayer. Pixel electrode matrix is set on the said second underlayer. The said LCD touch screen integrating single layer capacitive sensor also comprises capacitive touch sensor, the capacitive touch sensor comprises electrode layer which is set between the first underlayer and second underlayer. The said electrode layer comprises electrodes and electrode conductors which are used for electric connection of various electrodes; and both of the said electrodes and the electrode conductors are set in the same plane.

The said device comprises desktop computer, portable computer, Tablet PC, mobile communication terminal, video playback device, audio playback device, video/audio playback device, GPS navigation equipment and electronic measuring equipment.

Compared to the prior art, technical effect of the invention entitled "LCD touch screen integrating single layer capacitive sensor" is that:

1. In this invention, single layer capacitive sensor is set in the LCD touch screen, compared to the existing technology-double layer capacitive sensor, thickness of the LCD touch screen is reduced, conforming to the thinning even ultra-thin development tendency of the LCD touch screen;

2. In this invention, masking effect of black matrix is utilized, at the same time of masking pixel electrode matrix, electrodes and electrode conductors of capacitive sensor are also masked, enabling electrodes and electrode conductors unnecessary to be constrained to be made of transparent conductive material of high resistivity, and it is possible for electrodes and electrode conductors to be made of non-transparent plain conductors of low resistivity, thus using effect of capacitive touch screen has been enhanced and manufacturing cost has been reduced;

3. In this invention, replacement of black matrix inside of the LCD by electrode layer has reduced the thickness of LCD touch screen, enabling LCD touch screen to be able to develop towards thin even ultra-thin ones;

4. In this invention, capacitive touch sensor is set on the common potential electrode plane, thus technology difficulty is reduced, compared to the electrodes processed on the pixel electrode matrix, technology difficulty has not been increased, manufacturing cost is reduced, conforming to the development trend of LCD to thin even ultra-thin ones.

MODE OF CARRYING OUT THE INVENTION MODEL

Figure 1:
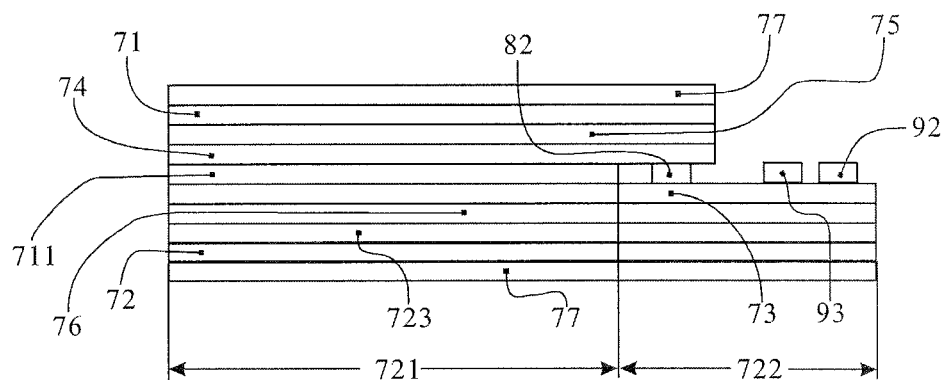
FIG. 1 is front view diagram for orthographic projection of "LCD touch screen integrating single layer capacitive sensor" in the first embodiment of the invention.

To further illustrate the principle and structure of the invention, the invention is further described in detail in accordance with the preferable embodiments shown in the figures.

The invention has put forward an LCD touch screen integrating single layer capacitive sensor as is shown from FIG. 1 to FIG. 24, comprising the first underlayer 71, the second underlayer 72, liquid crystal imaging material 73 set between the first underlayer 71 and second underlayer 72 as well as the control circuit. Color filter 711 is set on the said first underlayer 71. Pixel electrode matrix 723 is set on the said second underlayer 72, and the said pixel electrode matrix 723 comprises pixel electrodes which are distributed as matrix, and each pixel electrode is provided with pixel electrode driving circuit. In particular, it also comprises capacitive touch sensor, and the capacitive touch sensor comprises the electrode layer 74 which is set between the first underlayer 71 and second underlayer 72. The said electrode layer 74 comprises electrodes and electrode conductors which are for electric connection of various electrodes. Both of the said electrodes and electrode conductors are set in the same plane.

Figure 21:
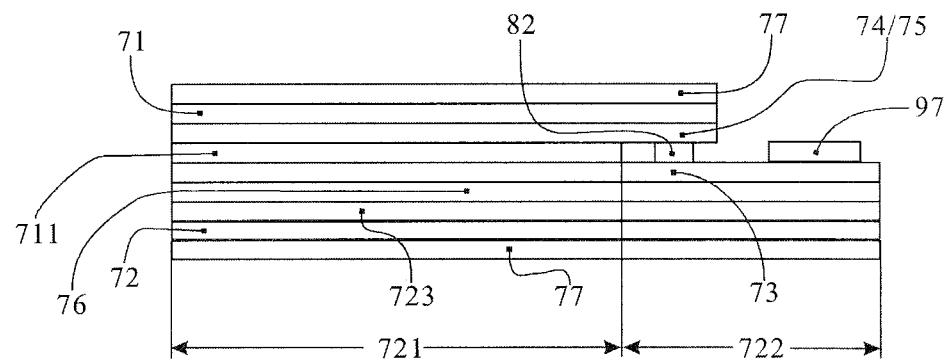
FIG. 21 is front view diagram for orthographic projection of the sixth embodiment of the invention.
Figure 24:
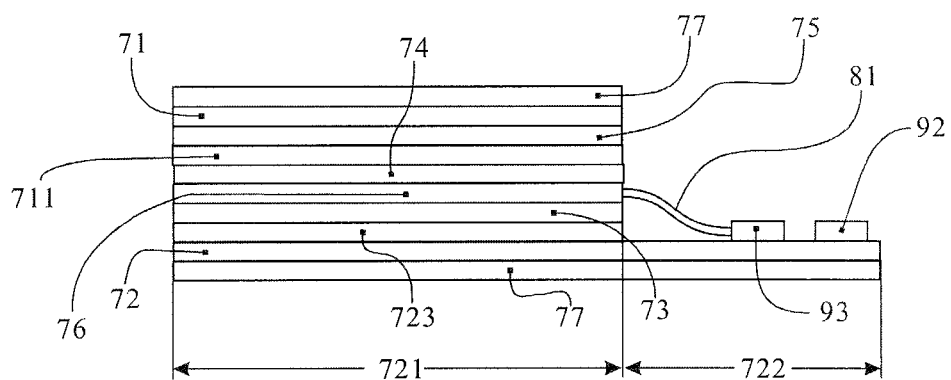
FIG. 24 is front view diagram for orthographic projection of the sixth embodiment of the invention.
Figure 25:
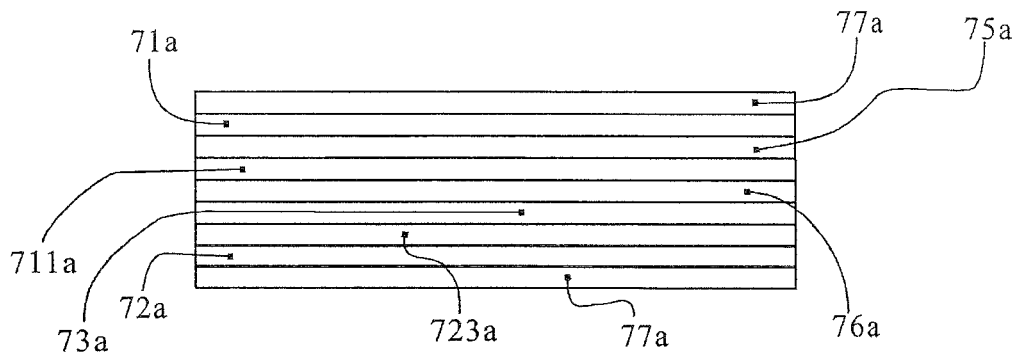
FIG. 25 is front view diagram for orthographic projection of the TN type LCD of the existing technology.
Figure 26:
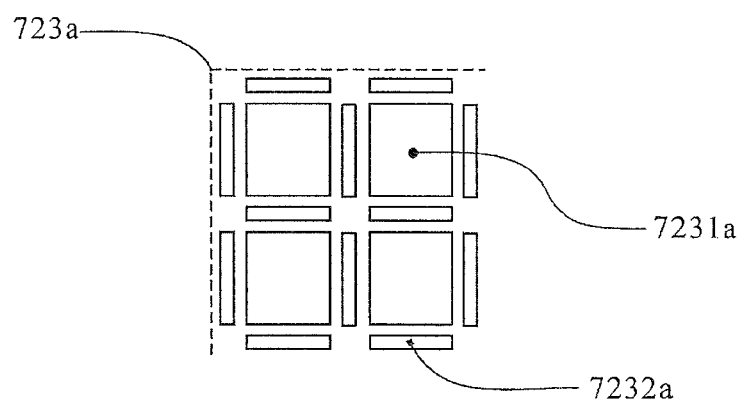
FIG. 26 is top view diagram for partial orthographic projection of pixel electrode matrix 723*a* of the prior art of LCD.
Figure 27:
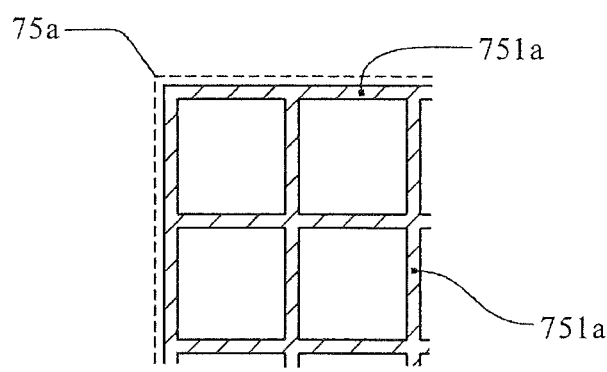
FIG. 27 is top view diagram for partial orthographic projection of black matrix 75*a* of the prior art of LCD.
Figure 28:
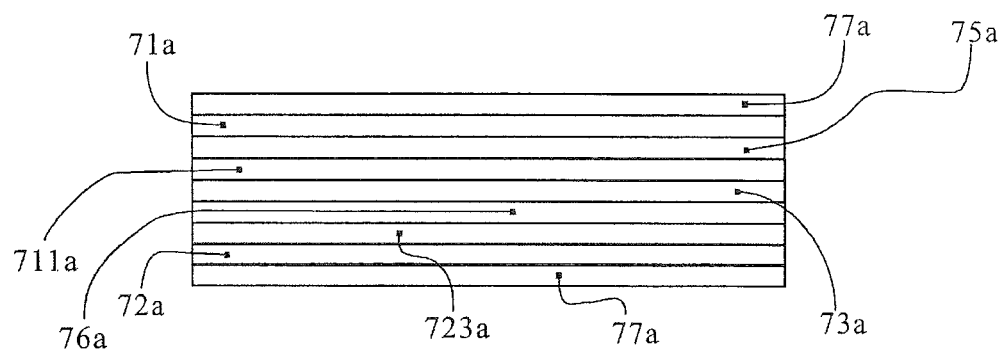
FIG. 28 is front view diagram for orthographic projection of prior art of the IPS type of LCD.

As is shown is FIG. 1, FIG. 21 and FIG. 24, the said LCD touch screen also comprises two polaroids 77 which respectively covers the first underlayer 71 and the second underlayer 72.

Both electrodes and electrode conductors are set in the same plane by the said electrode layer 74 of the invention, compared to the existing technology, thickness of the capacitive touch sensor is reduced, thus compared to the existing technology, the said LCD touch screen of the invention conforms to the development tendency to thin even ultra-thin ones. The invention has accounted for the lower of production cost and no need of technology realization difficulty increase through the following embodiments.

Figure 4:
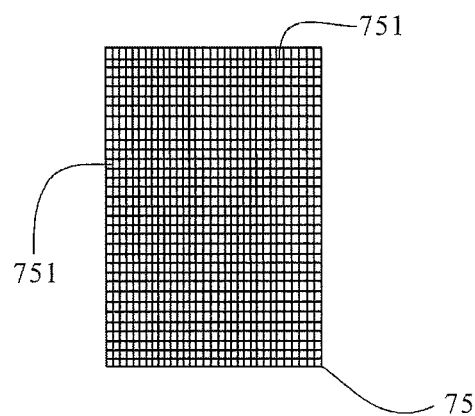
FIG. 4 is top view diagram for orthographic projection of the black matrix 75 of the said first embodiment.

As to the first embodiment of the invention shown in FIG. 1, capacitive sensing touch screen is integrated based on IPS LCD. The said LCD touch screen also comprises common potential electrode layer 76 and black matrix 75 inside. The said common potential electrode layer 76 is set on the second underlayer 72, and located on the pixel electrode matrix 723. Therefore, the said common potential electrode layer 76 is the mesh electrode surface similar to black matrix 75 made of transparent conductive material. A layer of black matrix 75 for all pixel electrode driving circuits masking pixel electrode matrix 723 is set on the said first underlayer 71. As is shown in FIG. 4, the black matrix 75 comprises masking tapes 751. The said electrode layer 74 is set at the first underlayer and covered by the said black matrix 75. All orthographic projections on the black matrix 75 for electrodes and electrode conductors inside of the electrode layer 74 fall on the masking tapes of the black matrix 75.

Figure 5:
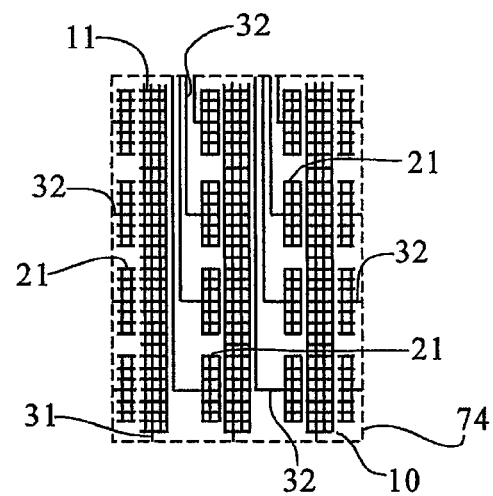
FIG. 5 is top view diagram for orthographic projection of the electrode layer 74 of the said first embodiment.
Figure 7:
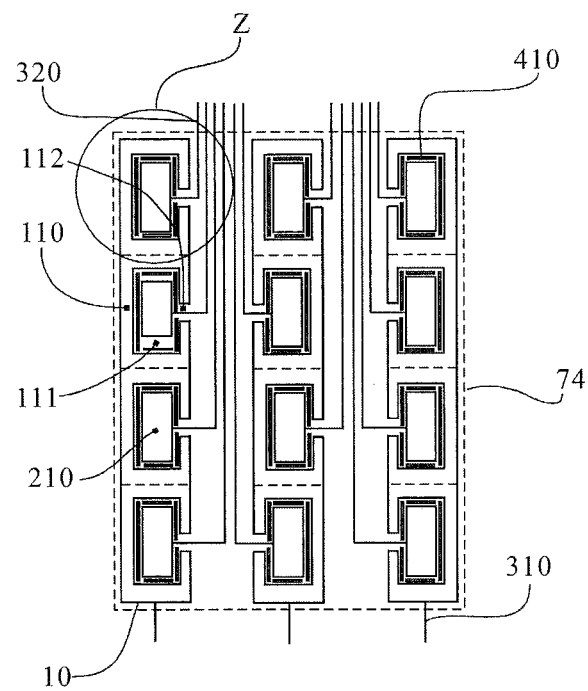
FIG. 7 is top view diagram for orthographic projections of the equivalent electrodes of the electrode layer 74 of the said second embodiment.

For the first embodiment of the invention, the said capacitive touch screen adopts single layer mutual capacitive touch screen as is shown in FIG. 5 and FIG. 7, the said capacitive touch sensor is based on the principle of mutual capacitance, the said electrode comprises first electrodes 11 and second electrodes 21 made of conductive material, the said electrode conductor comprises connecting conductors 31 for the first electrodes which are made of conductive material and electrically connected to the first electrodes 11, and second connecting conductors 32 which are electrically connected to the second electrodes 21. Any of the said first electrodes 11 and second electrodes 21 are placed in the display touch region of the said LCD touch screen without overlapping each other; there is no positional relation of crossover, spanning and intersection between the first connecting conductors 31 of the respective first electrodes 11, the second connecting conductors 32 of the respective second electrodes 21, and between any first connecting conductors 31 and second connecting conductors 32 in the display touch region of the LCD touch screen. Electrodes for electric connection of drive signals in the first electrodes 11 and second electrodes 21 are drive electrodes for receiving sensing electrodes of the electrodes feeding back signals from the electrodes.

Figure 6:
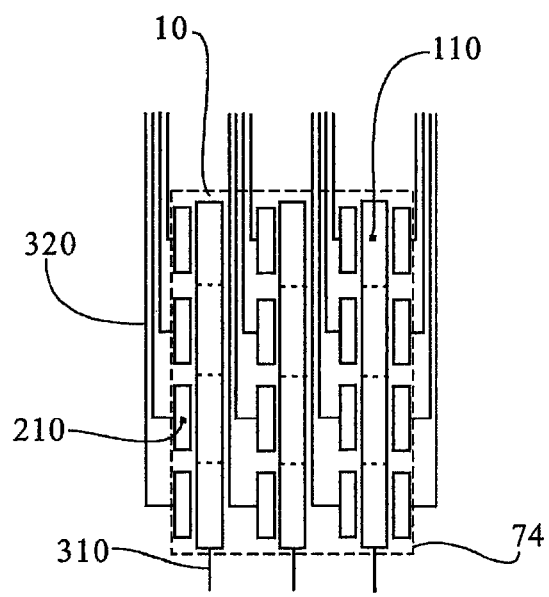
FIG. 6 is top view diagram for orthographic projections of the equivalent electrodes of the electrode layer 74 of the said first embodiment.

First embodiment of the invention has put forward a scheme of realizing the structure of above single layer electrode layer 74 as is shown in FIG. 6, the said first electrodes 11 are equivalent to first equivalent electrodes 110, the said second electrodes are equivalent to the second equivalent electrodes 210, the said first connecting conductors 31 are equivalent to first equivalent connecting conductors 310, and the said second connecting conductors 32 are equivalent to the second equivalent connecting conductors 320. The said first equivalent electrodes 110 are electrically connected to be at least two first equivalent electrode chains 10 in serial by groups by virtue of the first equivalent connecting conductors 310, respective centre lines of which are parallel to each other; and centre lines of the said first equivalent electrode chains 10 are lines connecting centroids of respective first equivalent electrodes 110 consisting the first equivalent electrode chains 10. The said second equivalent electrodes 210 are set between the two adjacent first equivalent electrode chains 10 and/or at the respective outside of the two most lateral first equivalent electrode chains 10; second equivalent connecting conductors 320 electrically connecting respective second equivalent electrodes 210 are set parallel to each other in the display touch region of the said LCD touch screen.

To reduce connecting conductors in the touch region 5 as much as possible, as is shown in FIG. 6, the said first equivalent electrodes 110 are of planar shapes. Planar borders of the adjacent first equivalent electrodes 110 in one first electrode chain 10 are connected, which are electrically connected by virtue of the adjacent planar borders, namely there is no first equivalent connecting conductor 310 between the two adjacent first equivalent electrodes 110 in the first equivalent electrode chain 10, thus, the said first equivalent electrode chains 10 are of long stripped planes.

While, in FIG. 5, border lines between the two adjacent first equivalent electrodes 110 are first electrodes.

Implementation scheme for electrode layer 74 is described by means of the above scheme with equivalent electrodes and equivalent electrode conductors, actual electrode layout structure is shown in FIG. 5, structure in FIG. 5 can be viewed that electrodes 11 and 21 and electrode conductors 31 and 32 are set following the structure of masking tapes 751 of the black matrix 75 in FIG. 4, and orthographic projections on FIG. 6 is formed by means of retaining electrodes 11 and 21, electrode conductors 31 and 32 falling inside of first equivalent electrodes 110, second equivalent electrodes 210, first equivalent electrode conductors 310 and second equivalent electrode conductors 320 as well as eliminating electrodes 11 and 21 and electrode conductors 31 and 32 falling outside of the equivalent electrodes 110 and 210. Both of the said first electrodes 11 and second electrodes 21 are of reticular structure; in FIG. 5, solid line part are electrodes and margins are voids between electrodes. From the perspective of electrode structure and layout, it is suitable to be described with equivalent electrodes and equivalent electrode conductors, while equivalent electrodes are composed of the said actual mesh electrodes, equivalent electrode conductors are composed of actual electrode conductors. The above actual electrode structure is adopted to ensure that all orthographic projections in the black matrix 75 for first electrodes 11, second electrodes 21, first electrode conductors 31 and second electrode conductors 32 fall on the masking tapes 751, thus, masking tapes 751 of the black matrix 75 have not only covered pixel electrode driving circuits of various pixel electrodes in the pixel electrode matrix, but covered all first electrodes 11, second electrodes 21, first electrode conductors 31 and second electrode conductors 32 in the electrode layer 74. Therefore, according to the above structure, all of the said first electrodes 11, second electrodes 21, first electrode conductors 31 and second electrode conductors 32 can be made of metal conductive material of low resistivity, thus, there is no problem that sensing effect will be influenced due to high resitivity for the electrode layer 74 which is made of metal conductive material. Moreover, the processing technique that electrode layer 74 is set under the black matrix 75 is relatively simple and mature, thus, technological requirements will not be increased. Therefore, thin even ultra-thin LCD touch screen can be realized with low cost and no need for the increase of technology difficulty.

Figure 2:
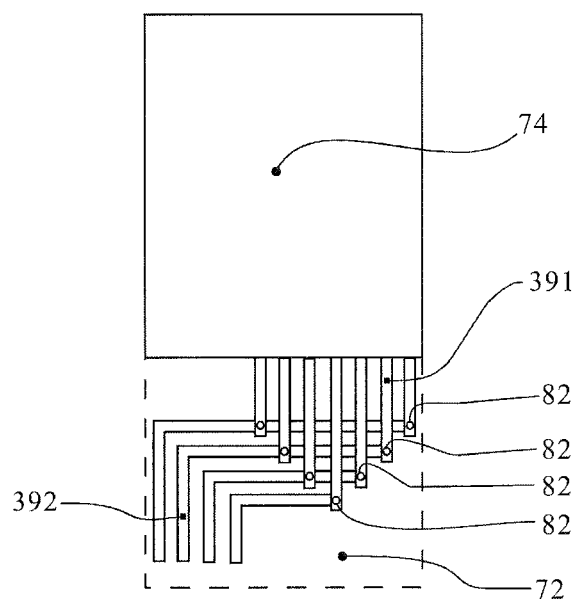
FIG. 2 is top view diagram for orthographic projections of lead wire 391 and 392 led out from electrode layer 74 which are electrically connected to the second underlayer 72 of the said first embodiment.

As to way of electric connection of devices on the first underlayer 71 and second underlayer 72, it is shown by FIG. 1 and FIG. 2 in the first embodiment of the invention, that the said LCD touch screen also comprises conductive contacts 82 set between the first underlayer 71 and second underlayer 72. Thus, devices set on the first underlayer 71 and second underlayer 72 are electrically connected by virtue of the conductive contacts 82. As is shown in FIG. 2, lead wires 391 of the said electrode layer are electrically connected to lead wires 392 on the second underlayer 72 by virtue of the conductive contacts, thus, electrodes of the electrode layer on the first underlayer 71 are electrically connected to the control circuits on the second underlayer 72.

Figure 3:
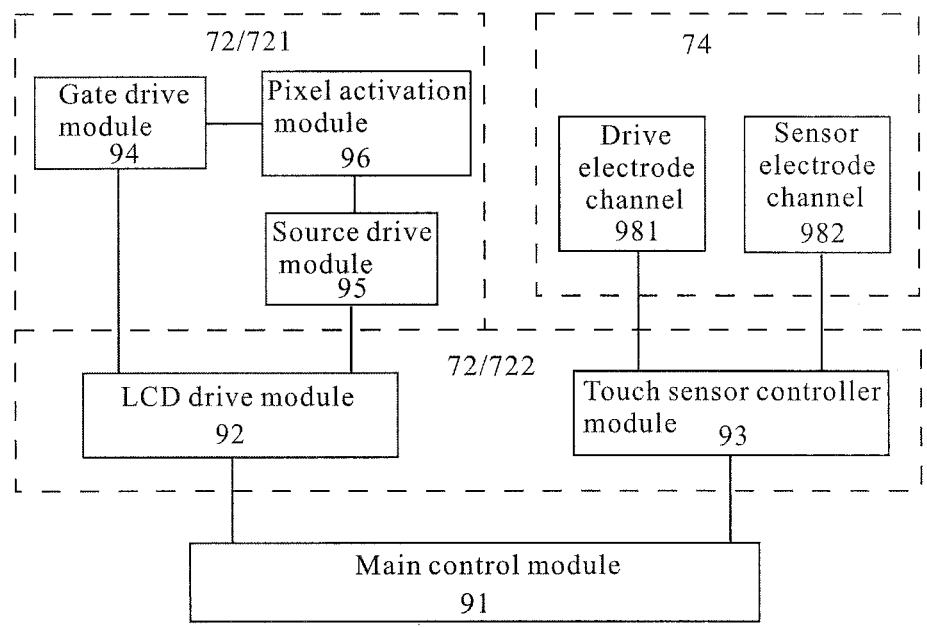
FIG. 3 is block diagram for electric principle of the control circuit for the said first embodiment.

In the first embodiment of the invention, as is shown in FIG. 3, the said control circuit comprises main control module 91 and LCD module and touch sensor module which are electrically connected to the main control module 91. The said LCD module comprises LCD drive module 92 and pixel electrode driving circuits, the said pixel electrode driving circuit comprises gate drive module 94 and source drive module 95 which are respectively electrically connected to the LCD drive module 92, as well as pixel activation module 96 which is electrically connected to the said gate drive module 94 and source drive module 95. In the embodiment, the said pixel activation module 96 is made of thin film transistor. Pixel electrode driving circuit for one pixel electrode is constituted by a group of gate drive module 94, source drive module 95 and pixel activation module 96. The said touch sensor module comprises touch sensor controller module 93, and the electrode channel which is electrically connected to the touch sensor controller module 93. The said electrode channel is formed by electric connection of electrode groups inside of the said electrode layer.

In the first embodiment of the invention as is shown in FIG. 1 and FIG. 3, area of the said second underlayer 72 is great than that of the first underlayer 71, the second underlayer 72 comprises display touch area 721 which is over against the first underlayer 71, and the epitaxial region 722 which is outward extended by the said display touch area 721. The said gate driver module 94, source driver module 95 and pixel activation module 96 are set at the display touch region 721 of the second underlayer 72. The said LCD driver module 92 and touch sensor controller module 93 are set at the epitaxial region 722 of the second underlayer 72. The said electrode channel is set inside of the electrode layer 74 on the first underlayer 71.

As mentioned above, the first embodiment of the invention, as is shown in FIG. 1 and FIG. 2 also comprises conductive contacts 82 which are used for realizing electric connection between the first underlayer 71 and second underlayer 72. Electrode conductors of the first underlayer 71 led out from the electrode layer 74 are electrically connected to the said touch sensor controller module 93 by the said electrode channel by virtue of the conductive contacts 82.

As a way of replacement, the first underlayer 71 is led out from the said electrode layer 74 by electrode channel and electrically connected to the said touch sensor controller module 93 by virtue of the flexible PCB 81.

Because the said capacitive touch sensor is based on the principle of mutual capacitance as is shown in FIG. 3, the said electrode channel comprises the drive electrode channel 981 which is electrically connected by the drive electrode groups and the sensor electrode channel 982 which is electrically connected by the sensor electrode groups.

To improve effective permittivity, electrodes for the said electrode layer 74 also comprise dumb electrodes 41 which have no electrical connection relationship, i.e. the dumb electrodes are at electric dangling state. Specific locations of the dumb electrodes 41 can be reflected by the attached drawings of the subsequent embodiments. The said dumb electrodes 41 are equivalent to equivalent dumb electrodes 410. The said equivalent dumb electrodes 410 are set at the void areas between the first equivalent electrodes 110, the second equivalent electrodes 210, and between the first equivalent electrodes 110 and the second equivalent electrodes 210.

The second embodiment of the invention has put forward another structural scheme realizing the said single layer electrode layer 74, as is shown in FIG. 7, the said first electrodes 11 are equivalent to the first equivalent electrodes 110, the said second electrodes are equivalent to the second equivalent electrodes 210, the said first connecting conductors 31 are equivalent to the first equivalent connecting conductors 310, and the said second connecting conductors 32 are equivalent to the second equivalent connecting conductors 320. The said first equivalent electrodes 110 are electrically connected to be at least two first equivalent electrode chains 110 by groups in serial by virtue of the first connecting conductors 310, respective center lines of which are parallel to each other. Center lines of the said first equivalent electrode chains 10 are lines connecting centroids composing respective first equivalent electrodes 10 of the first equivalent electrode chains 10. The said first equivalent electrodes 110 are set with hollowed equivalent electrode accommodating areas 111, and the first equivalent electrodes 110 are set with at least one equivalent wire slot 112, by virtue of the equivalent wire slots 112, the areas where equivalent electrode accommodating areas 111 are located inside of the said first equivalent electrodes 110 are connected with the areas outside of the first equivalent electrodes 110. The said second equivalent electrodes 210 are set inside of the equivalent electrode accommodating areas 111 of the first equivalent electrodes 110 corresponding to the second equivalent electrodes 210. Second equivalent connecting conductors 320 electrically connected to the said second equivalent electrodes 210 are led out from the equivalent wire slots 112 of the said first equivalent electrodes 110. And second equivalent connecting conductors 320 electrically connected to the respective second equivalent electrodes 210 are set in parallel inside of the areas outside of the first equivalent electrodes 110.

Figure 8:
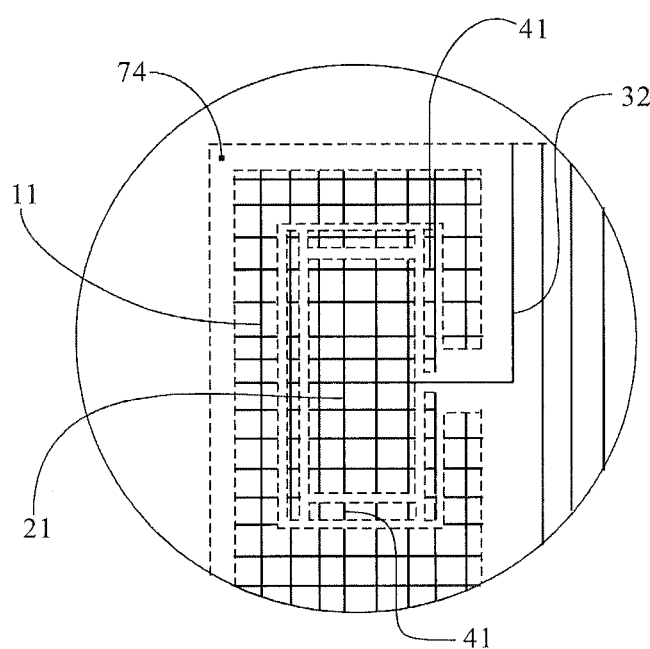
FIG. 8 is partial magnified diagram of actual electrodes at the area indicated by Z in FIG. 7.

In FIG. 8, actual electrode structure which is equivalent to the structure of equivalent electrodes as is shown in FIG. 7 is shown. As is the same with the first embodiment, both of the said first electrodes 11 and second electrodes 21 are of reticular structure. In FIG. 8, solid line section is the area where electrodes lie, and void section is gaps between electrodes. From the perspective of electrode structure and layout, it is suitable to be described with equivalent electrodes and equivalent electrode conductors, while equivalent electrodes are composed of the said actual mesh electrodes, equivalent electrode conductors are composed of actual electrode conductors. The above actual electrode structure is adopted to ensure that all orthographic projections in the black matrix 75 for first electrodes 11, second electrodes 21, first electrode conductors 31 and second electrode conductors 32 fall on the masking tapes 751, thus, masking tapes 751 of the black matrix 75 have not only covered pixel electrode driving circuits of various pixel electrodes in the pixel electrode matrix, but covered all first electrodes 11, second electrodes 21, first electrode conductors 31 and second electrode conductors 32 in the electrode layer 74. Therefore, according to the above structure, all of the said first electrodes 11, second electrodes 21, first electrode conductors 31 and second electrode conductors 32 can be made of metal conductive material of low resistivity, thus, there is no problem that sensing effect will be influenced due to high resistivity for the electrode layer 74 which is made of metal conductive material. Moreover, the processing technique that electrode layer 74 is set under the black matrix 75 is relatively simple and mature, thus, technological requirements will not be increased. Therefore, thin even ultra-thin LCD touch screen can be realized with low cost and no need for the increase of technology difficulty.

In the second embodiment, as is shown in FIG. 7 and FIG. 8, the said electrode layer 74 also comprise dumb electrodes 41 which have no electrical connection relationship, i.e. the dumb electrodes are at electric dangling state. The said dumb electrodes 41 can be reflected by the attached drawings of the subsequent embodiments. The said dumb electrodes 41 are equivalent to equivalent dumb electrodes 410.

The said equivalent dumb electrodes 410 are set at the void areas between the first equivalent electrodes 110, the second equivalent electrodes 210, and between the first equivalent electrodes 110 and the second equivalent electrodes 210.

The said first equivalent electrodes 110 form mutual capacitance coupling units with second equivalent electrodes 220 inside of the equivalent electrode accommodating areas 111 of the first equivalent electrodes 110. With respect to the mutual capacitance coupling units, there are concrete structures shown below:

To enhance coupling effect in a better way and improve the effective permittivity, as is shown from FIG. 9-FIG. 13, as to one basic coupling unit, the said second electrode 210 comprises at least two sub-electrodes and connecting electrodes 212 which are set between the adjacent two sub-electrodes 211. The said sub-electrodes 211 are the planes whose first centre lines and second centre lines are perpendicular. Length of the first line segment AB where the said sub-electrodes 211 are collinear with the first center lines is shorter than the length of the second center line segment CD where the said sub-electrodes 211 are collinear with the second center lines. Respective second center lines of the said sub-electrodes 211 are set parallel to each other. Taking the direction where the second center lines of the said sub-electrodes 211 are located as the width direction, width of the said connecting electrodes 212 is shorter than the width of the second center line segment where the said sub-electrodes 211 are collinear with the second center lines. Planar borders between the said sub-electrodes 211 and the connecting electrodes 212 are electrically connected by virtue of the mutually adjacent planar borders. Thus, the said second equivalent electrodes 210 are of planar shape with at least one groove; border shapes of the electrode accommodating areas 111 for the first equivalent electrodes 110 corresponding to the said second equivalent electrodes 210 are adaptive to the planar border shapes of the second equivalent electrodes 210, thus, borders of the said equivalent electrode accommodating areas 111 are of zigzag shapes.

Figure 9:
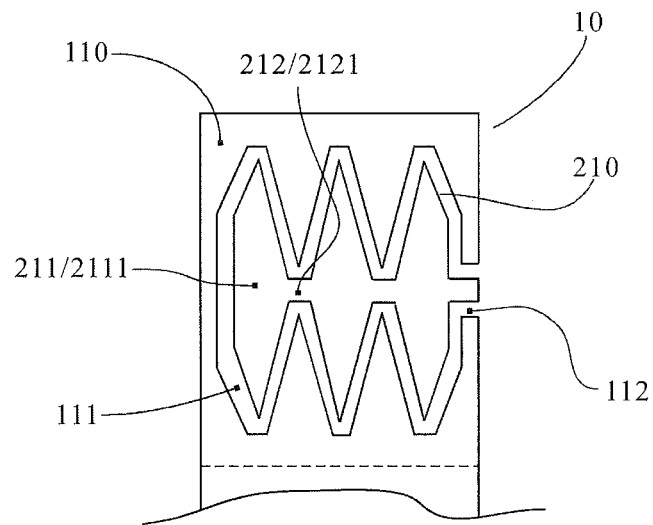
FIG. 9 is partial diagram for a mutual capacitive coupling unit of the said second embodiment.
Figure 10:
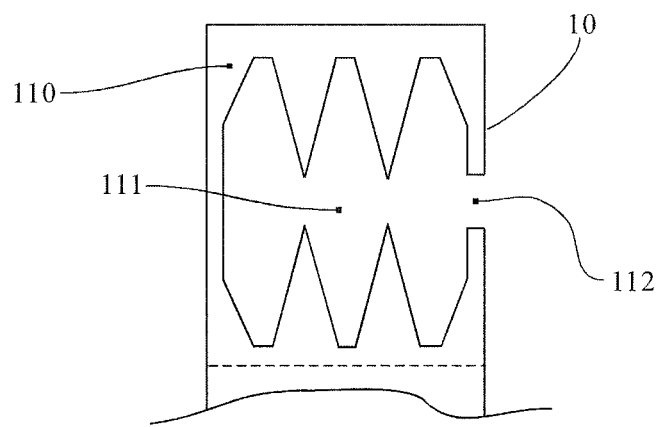
FIG. 10 is structure diagram for the first equivalent electrodes 110 of the mutual capacitive coupling unit as is shown in FIG. 9.
Figure 11:
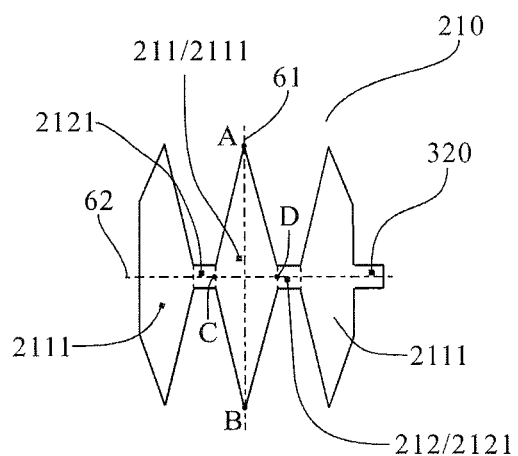
FIG. 11 is structure diagram for the second equivalent electrodes 210 of the mutual capacitive coupling unit as is shown in FIG. 9.

As is shown from FIG. 9 to FIG. 11, the said sub-electrodes 211 are diamond-alike sub-electrodes 2111 with opposite angles cut off, i.e. the diamond-alike sub-electrodes 2111 are hexagons obtained from diamonds whose angles at both sides of the second centre lines are cut off by a pair of straight lines parallel to the said second centre lines. The said connecting electrodes 212 are rectangular connecting electrodes 2121.

Figure 12:
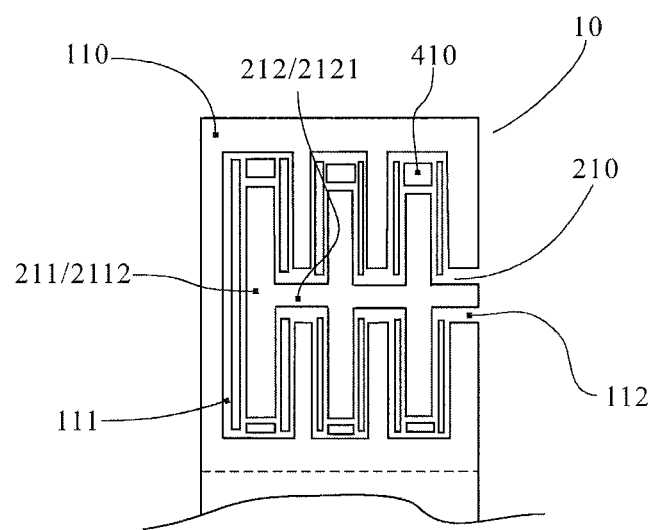
FIG. 12 is partial diagram for the other kind of mutual capacitive coupling unit of the said second embodiment.
Figure 13:
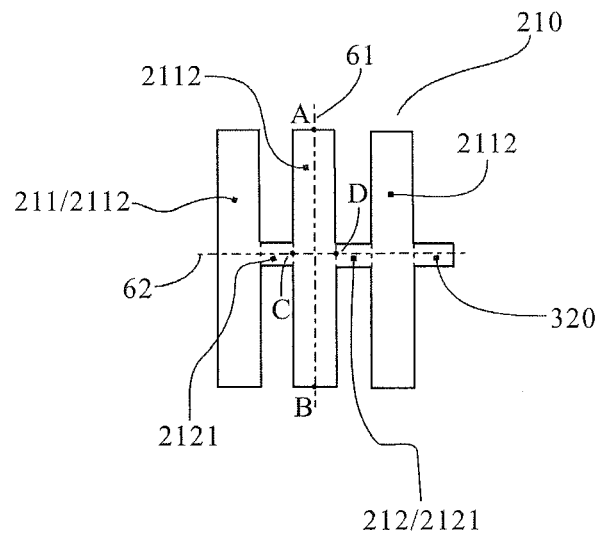
FIG. 13 is structure diagram for the second equivalent electrodes 210 of the mutual capacitive coupling unit as is shown in FIG. 12.

As is shown in FIGS. 12 and 13, the said sub-electrodes 211 are rectangular sub-electrodes 2112. The said connecting electrodes 212 are rectangular connecting electrodes 2121.

The said sub-electrodes 211 can also be oval or oval-alike, or any axial symmetric figures whose boundary lines are irregular with the first centre lines as the symmetric axis, or any axial symmetric figures whose boundary lines are irregular with the second centre lines as the symmetric axis.

The third embodiment of this invent provides a bridging type monolayer mutual capacitance sensor which allows electrode conductors to cross and converge, as shown in FIGS. 14-47; the said capacitance touch sensor is based on the principle of mutual capacitance; the said electrode comprises the first electrodes 13 and the second electrodes 23 which are made of conductive material and said electrode conductor includes the horizontal connecting conductors 33. The masking tapes 751 of said black matrix 75 are made of conductive material, including the bridging masking tapes 7511 and the dumb electrode masking tapes 7512 which are not electrically connected with each other. The said dumb electrode masking tapes 7512 are in the electrically dangling state. Two ends of a bridging masking tapes 7511 are provided with two electric connection posts 751111 respectively which stretch into the electrode layer 74. In the actual products, the said electric connection posts 75111 can also be made of the material for electrode layer 74 and manufactured while the said electrode layer 74 is made, that is, the said electric connection posts 75111 can also be a part of the electrode plates respectively that are adjacent to each other and required to be electrically bridged, and the electric bridging connection between electrode plates is actualized by said electric connection posts 75111 at both ends of the said bridging masking tapes 7511. Therefore, said electric connection post 75111 can be not only a part of electrode layer 74, during the manufacturing process of which said electric connection post 75111 is successfully manufactured; but also a part of black matrix 75, during the manufacturing process of which the said electric connection post 75111 is successfully made. These two cases are substantially the same, i.e. the electric bridging connection of the electrodes in the said electrode layer 74 is achieved by virtue of the said black matrix 74. Any of the said first electrodes 13 and any of the said second electrodes 23 are placed in the display touch area of the said LCD touch screen without overlapping each other. Either of the said first electrodes 13 and the said second electrodes 23 is connected via the said connecting conductors 33 in the same layer. The electric connection of the other the said first electrodes 13 and the said second electrodes 23 is actualized by means of said bridging masking tapes 7511 and two electric connection posts 75111 of the said black matrix 75.

The said first electrodes 13 are equivalent to the first equivalent electrodes 130, the said second electrodes 23 are equivalent to the second equivalent electrodes 230, and the said connecting leads 33 of the same layer are equivalent to the equivalent connecting conductors 330 of the same layer.

Figure 14:
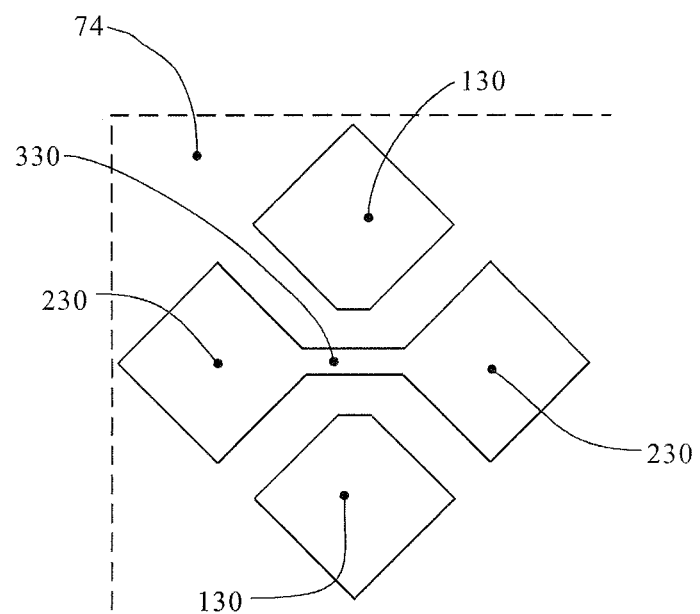
FIG. 14 is top view diagram for partial equivalent electrodes viewing from orthographic projection of the electrode layer 74 of the third embodiment of the invention.
Figure 15:
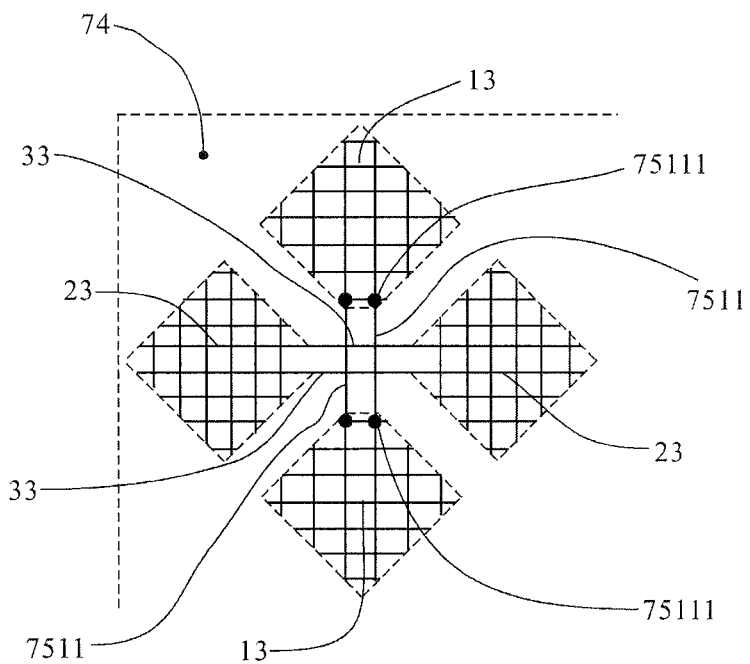
FIG. 15 is top view diagram for partial actual electrodes viewing from orthographic projection of the electrode layer 74 corresponding to FIG. 14.
Figure 16:
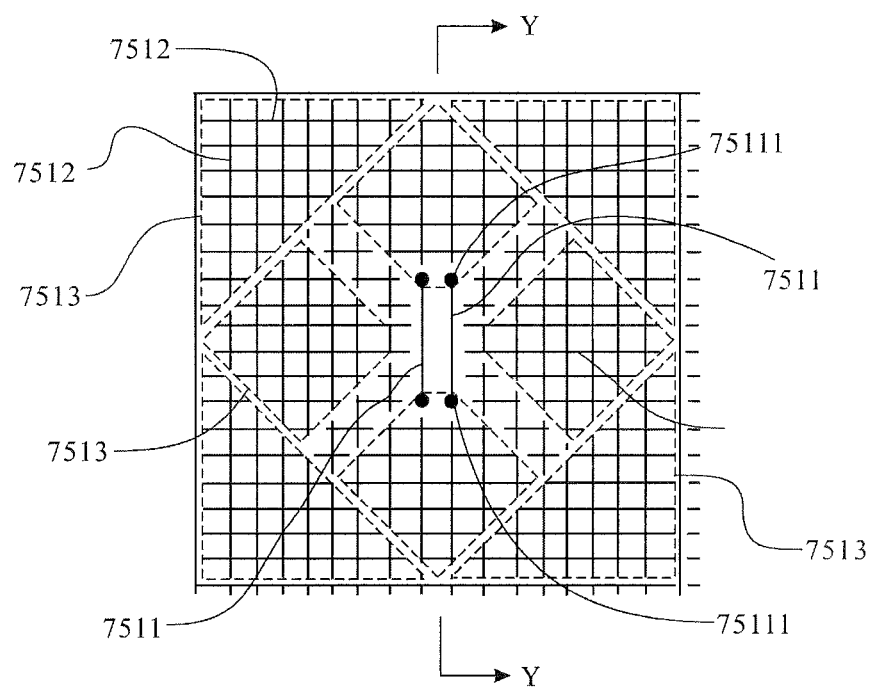
FIG. 16 is top view diagram for partial orthographic projection of black matrixes 15 corresponding to the electrode layer 74 as is shown in FIG. 14 of the third embodiment of the invention.
Figure 17:
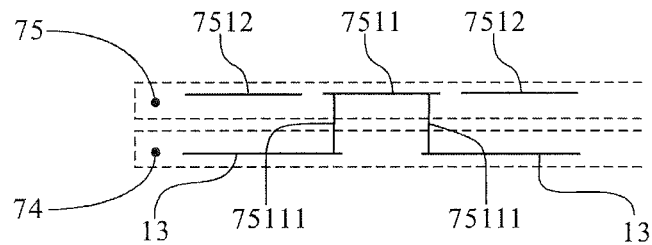
FIG. 17 is section view diagram at Y-Y direction in FIG. 16.

In the electrode layer 74, only one of the said first electrodes 13 and the said second electrodes 23 is connected via the said connecting conductors 33 in the same layer, as shown in FIGS. 14 and 15. In the third embodiment, the said second electrodes 23 are electrically connected via the said connecting conductors in the same layer, that is to say, the said second equivalent electrodes 230 are electrically connected by the said equivalent connecting conductors of the same layer. For the said other electrodes, the said first electrodes 13 in the same electrode layer 74 have no connecting conductor, and the electric connection between two first electrodes 13 is actualized by means of the said bridging masking tapes 7511 in the said black matrix 75. FIG. 15 shows the actual mesh electrode structure reaching the equivalent electrode effect in FIG. 14. The concrete structure of the said bridging masking tapes 7511 is clearly reflected through FIGS. 16 and 17. Two first electrodes 13 are electrically bridged by means of said bridging masking tapes 7511 of the said black matrix 75. Obviously, as shown in FIG. 16, all dumb electrode masking tapes 7512 should be disconnected from the said bridging masking tapes 7511 so that all dumb electrode masking tapes 7512 operate as a dumb electrode. As shown in FIG. 16, the said dumb electrode masking tapes 7512 are separated into at least two dumb electrode blocks 7513 which are not electrically connected, and the dumb electrode masking tapes 7512 in the same dumb electrode block 7513 are electrically connected. In order to obtain good results, as shown in FIG. 16, the said dumb electrode blocks 7513 in the third embodiment should include the blocks corresponding to the said first electrodes 13, the blocks corresponding to the said second electrodes 23 and the blocks corresponding to the gap between the said first electrodes 13 and second electrodes 23. In the third embodiment, the matter of insulation between conductors mutually crossing or converging which are used for connecting different kinds of electrodes can be solved through bridging of the said black matrix 75. In order to define the corresponding relation between equivalent electrodes and actual electrodes in attached figures, the equivalent electrode blocks equivalent to actual electrodes are marked with dashed line in FIG. 15 and subsequent figures.

Similarly, to improve effective capacity, the electrodes for the said electrode layer 74 also comprise dumb electrodes 41 which have no electrical connection relationship, i.e. the dumb electrodes are in the electric dangling state. The said dumb electrodes 41 are equivalent to the equivalent dumb electrodes 410. The said equivalent dumb electrodes 410 are placed in the gaps between the said first equivalent electrodes 130, between the said second equivalent electrodes 230 as well as between the said first equivalent electrodes 130 and the said second equivalent electrodes 230.

Figure 18:
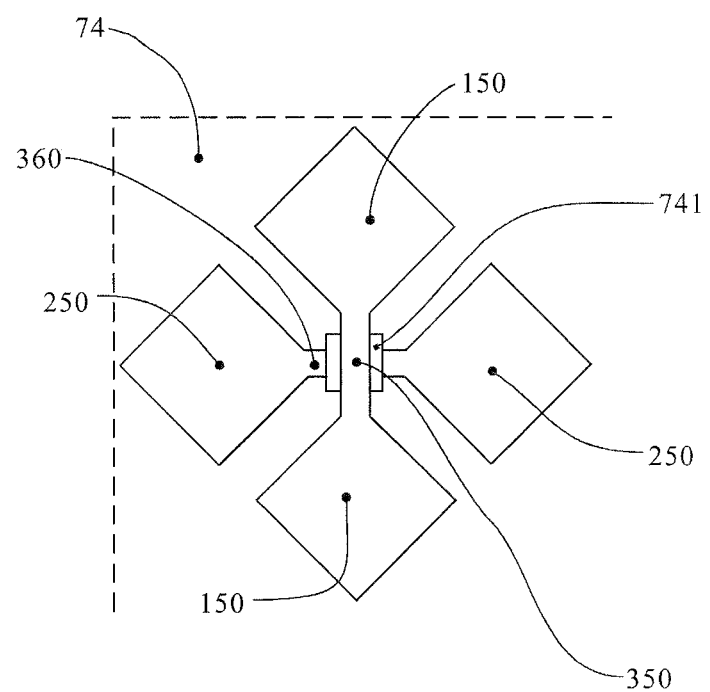
FIG. 18 is top view diagram for partial equivalent electrodes viewing from orthographic projection of the electrode layer 74 of the fourth embodiment of the invention.
Figure 19:
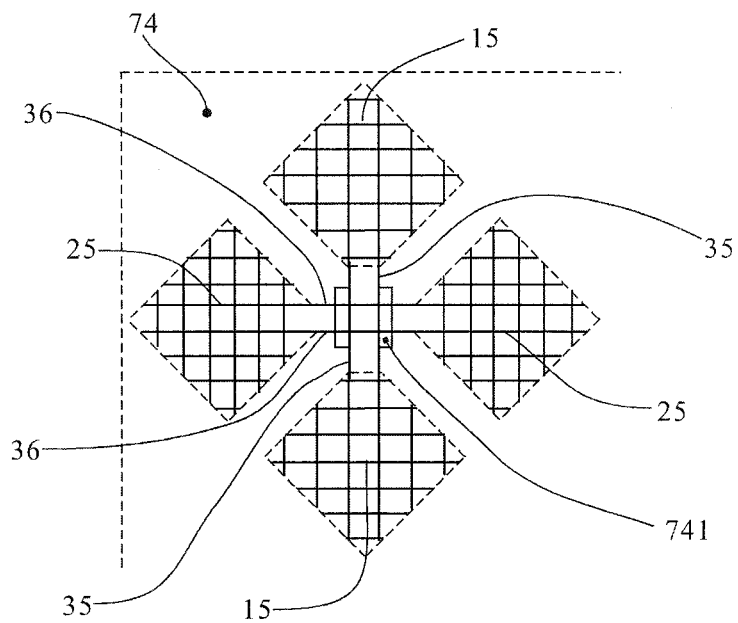
FIG. 19 is top view diagram for partial actual electrodes viewing from orthographic projection of the electrode layer 74 corresponding to FIG. 18.

The fourth embodiment of this invent provides another monolayer mutual capacitance sensor which allows electrode conductors to cross and converge, as shown in FIGS. 18-19; the said capacitance touch sensor is based on the principle of mutual capacitance; the said electrodes comprises the first electrodes 15 and the second electrodes 25 which are made of conductive material, and the said electrode conductors include the first connecting conductors 35 used for electrically connecting with the said first electrodes 15 and the second connecting conductors 36 used for electrically connecting with the said second electrodes 25, both being made of conductive material. Any of the said first electrodes 15 and second electrodes 25 are placed in the display touch area of the said LCD touch screen without overlapping each other. At the cross sections between the said first connecting conductors 35, between the said second connecting conductors 36 and between any first connecting conductor 35 and any second connecting conductor 36, the said first electrodes 15 and the said second electrodes 25 are enabled not to be electrically connected through wire overhead structure or installing separation medium.

Since the wire overhead structure only similar to the bridging structure in the third embodiment could increase the thickness of the electrode layer, the separation medium 741 should be installed between the said first connecting conductors 35 and the said second connecting conductors 36 in most cases to solve the matter of insulation between the first connecting conductors 35 and the second connecting conductors 36.

The said first electrodes 15 are equivalent to the first equivalent electrodes 150, the said second electrodes 21 are equivalent to the second equivalent electrodes 250, the said first connecting conductors 35 are equivalent to the first equivalent connecting leads 350, and the said second connecting conductors 36 are equivalent to the second equivalent connecting leads 360. The first equivalent connecting conductors 350 are used for electrically connecting the first equivalent electrodes 150 in groups into at least one first electrode chain; and the second equivalent connecting conductors 360 are used for electrically connecting the second equivalent electrodes 250 in groups into at least one second electrode chain.

The electrode structure, electrode conductor structure, equivalent electrode and equivalent electrode conductor in the fourth embodiment are the same as those in the aforesaid embodiment, so they will not be mentioned again.

The electrodes for the said electrode layer 74 in the fourth embodiment also comprise dumb electrodes 41 which have no electrical connection relationship, i.e. the dumb electrodes are in the electrically suspended state. The said dumb electrodes 41 are equivalent to the equivalent dumb electrodes 410. The said equivalent dumb electrodes 410 are placed in the gaps between the said first equivalent electrodes 150, between the said second equivalent electrodes 250 as well as between the said first equivalent electrodes 150 and the said second equivalent electrodes 250.

Figure 20:
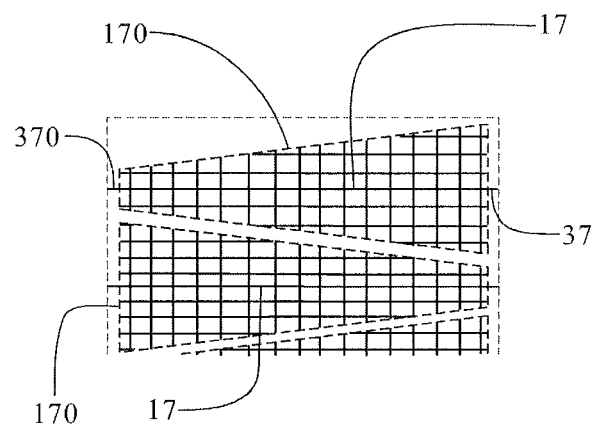
FIG. 20 is top view diagram for partial equivalent electrodes viewing from orthographic projection of the electrode layer 74 of the fifth embodiment of the invention.

In the fifth embodiment of the present invention, as shown in FIG. 20, said capacitance touch sensor is based on the principle of self capacitance, and the said electrodes comprise the third electrodes 17 made of conductive material. The said electrodes include the third connecting conductors 37 which are respectively electrically connected to the said third electrodes 17. The said third electrodes are equivalent to the third equivalent electrodes 170, which are of trapezoidal plane shape. The said third connecting conductors 37 are equivalent to the third equivalent connecting conductors 370. Any two adjacent third equivalent electrodes 170 are arranged in the pattern where the upper base of the third equivalent electrode 170 for one trapezoid is collinear with the lower base of the third equivalent electrode 170 for the other trapezoid and the lower base of the third equivalent electrode 170 for one trapezoid is collinear with the upper base of the third equivalent electrode 170 for the other trapezoid, thus enabling all third equivalent electrodes 170 to be arranged in the display touch area of the said LCD touch screen in the form of occlusion; the said third connecting conductors 370 are led out of the electrode layer 74 in parallel. The said third equivalent electrodes 170 corresponding to actual third electrodes 17 are marked with dashed line in FIG. 20.

As mentioned above, the electrodes for the said electrode layer 74 also comprise dumb electrodes 41 which have no electrical connection relationship, i.e. the dumb electrodes are in the electric dangling state. The said dumb electrodes 41 are equivalent to the equivalent dumb electrodes 410. The said dumb electrodes 410 are installed in the gap area between the said third equivalent electrodes 170.

Figure 22:
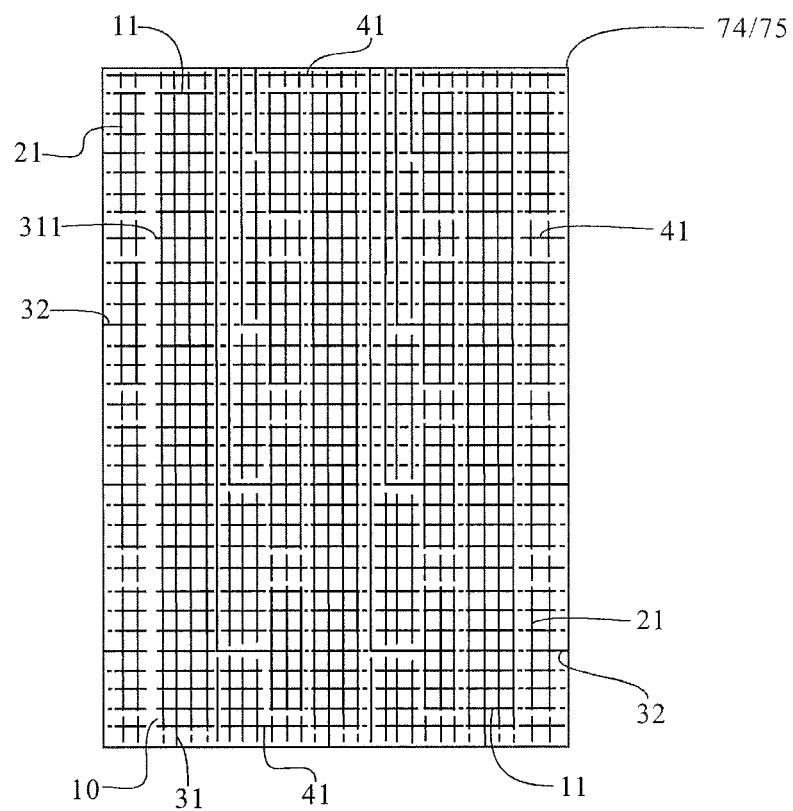
FIG. 22 is top view diagram for orthographic projection of the electrode layer 74 of the said sixth embodiment.
Figure 23:
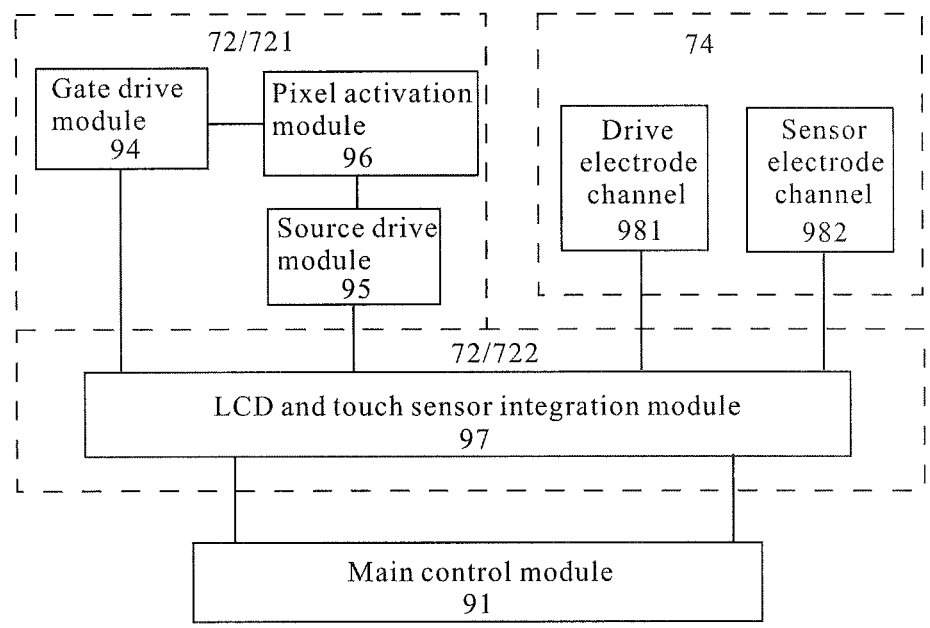
FIG. 23 is block diagram for electric principle of the control circuit for the said sixth embodiment.

As shown in FIG. 21 to FIG. 23, one of differences between the sixth embodiment and the first embodiment of this invention is that the electrode layer 74 is used to substitute for the said black matrix 75. Electrodes and electrode conductors in the said electrode layer (74) are made of conductive material which is non-transparent and non-reflective on the surface; all orthographic projections of said electrodes and electrode leads on the plane where pixel electrode matrix (723) is located fall on the driving circuits of all pixel electrodes in the pixel electrode matrix (723), thus enabling the electrode layer 74 to shield the driving circuits of all pixel electrodes in the pixel electrode matrix 723. Since the purpose of said black matrix 75 is to shield the driving circuits of all pixel electrodes in the pixel electrode matrix, the mesh electrodes electrically isolated from all electrodes are required to be used in the gap area between electrodes when the said electrode layer 74 is used to substitute for black matrix and these filled electrodes operate as said dumb electrodes 41, that is to say, the dumb electrodes must be increased at the electrode layer when the electrode layer is used for replacing the black matrix, and the said dumb electrodes 41 operate not only as improving effective capacitivity, but also as the masking tapes of black matrix. In that way, all electrodes and electrode conductors in the said electrode layer 74 operate not only as electrodes and electrode conductors, but as masking tapes of black matrix; therefore, the orthographic projections of the said electrodes and electrode conductors in the pixel electrode matrix 723 must fall on the driving circuits of all pixel electrodes. FIG. 22 is the schematic diagram after the dumb electrodes 41 are increased on the basis of the electrode layer shown in FIG. 5 of the first embodiment.

The concrete structures of the capacitance touch sensors in the first, the second, the fourth and the fifth embodiments can be applied to the sixth embodiment. The electrode layer 74 can substitute for the black matrix 75 provided that the electrodes operating as dumb electrodes are filled between electrodes as well as between electrode conductors on the basis of the electrode layer for the capacitance touch sensors in the embodiments in order to enable all electrodes and electrode conductors in the said electrode layer to shelter the driving circuits of all pixel electrodes in the pixel electrode matrix 723.

The another difference between the sixth embodiment and the first embodiment is that the LCD module and the touch sensor module are integrated into the liquid crystal display (LCD) and touch sensor integration module 97. As shown in FIG. 23, the said control circuit comprises main control module 91 and LCD and touch sensor integration module 97 which are electrically connected to the main control module 91. The said control circuit also comprises the gate drive module 94 and the source drive module 95 which are respectively electrically connected to the said LCD and touch sensor integration module 97, and the pixel activation module 96 which is electrically connected to the said gate drive module 94 and source drive module 95. The said control circuit also comprises the electrode channel which is electrically connected to said LCD and touch sensor integration module 97. The said electrode channel is formed through group connection of electrodes in the electrode layer 74.

As shown in FIGS. 21 and 23, the area of the second underlayer 72 is greater than that of the first underlayer 71, and said second underlayer 72 comprises the display touch area 721 which is over against the first underlayer 71, and the epitaxial region 722 which is outward extended by said display touch area 721. The said gate drive module 94, source drive module 95 and pixel activation module 96 are installed at the display touch area 721 of the second underlayer 72. The said LCD and touch sensor integration module 97 are installed in the epitaxial region 722 of the said second underlayer 72. The said electrode channel 410 is installed in the electrode layer 74 on the first underlayer 71.

In the sixth embodiment, as shown in FIG. 21, the said LCD touch screen also comprises the conductive contacts 82 which are used for electrical connection between the first underlayer 71 and the second underlayer 72. The electrode conductors of the first underlayer 71 led out of the electrode layer 74 are electrically connected by said electrode channel by means of the said conductive contacts 82 to the said LCD and touch sensor integration module 97.

Also, the flexible printed circuit board is adopted for connection, and the electrode conductors of the first underlayer 71 led out of the electrode layer 74 are electrically connected by the said electrode channel by means of the flexible printed circuit board to the said LCD and touch sensor integration module 97.

As shown in FIG. 24, one of differences between the seventh embodiment and the first embodiment of this invention is that the electrode layer is processed to the common potential electrode layer 76. The common potential electrode layer 76 is installed on said first underlayer 71 or the said second underlayer 72. The electrode layer 74 of the said capacitance touch sensor is installed near the said common potential electrode layer 76, and all orthographic projections of electrodes and electrode conductors in the said electrode layer 74 on the said common potential electrode layer 76 fall within the said common potential electrode layer 76. Since the seventh embodiment is based on TN type liquid crystal display (LCD) and the said common potential electrode layer 76 is a one-piece plate electrode, the concrete structures of the capacitance touch sensors in the first, the second, the fourth and the fifth embodiments can be applied to the seventh embodiment. If the seventh embodiment is based on IPS type LCD and the said common potential electrode layer 76 is similar to the structure of the said black matrix 75, then the electrodes and electrode conductors in the said electrode layer 74 can be entirely according to the first, the second, the fourth and the fifth embodiments, i.e. the same electrodes and electrode conductors can be installed according to the structure of common potential electrode in the said common potential electrode layer 76. The electrodes and electrode materials in said electrode layer 74 can be made of transparent conducting material with low electrical resistivity. Consequently, for the LCD touch screen based on IPS liquid crystal display, the said common potential electrode layer 76 comprises at least one common potential electrode, which is installed over against the gap area between pixel electrodes and arranged in a mesh structure same with said black matrix 75, and orthographic projections of electrodes and electrode conductors in said electrode layer 74 on said common potential electrode layer 76 fall within the common potential electrodes. The installation mode of actual electrodes can be completely by reference to the above embodiment where the actual electrode is formed at the equivalent electrode according to the structure of said black matrix 75, so the structures of capacitance touch sensors in the Embodiments 1-5 can be applied to the LCD touch screen based on IPS liquid crystal display. Since the installation of electrodes and electrode conductors on the said common potential electrode layer 76 is not more difficult than they are installed on the pixel electrode matrix, the said electrode layer 74 can be easily installed on the common potential electrode layer 76, with lower manufacturing cost.

The another difference between the seventh embodiment and the first embodiment is about the implementation mode of electric connection of the devices on said first underlayer 71 and the devices on said second underlayer 72; in the seventh embodiment of the present invention, as shown in FIG. 24, said LCD touch screen also comprises the flexible printed circuit board 81. The electric connection between the devices installed on said first underlayer 71 and the devices on said second underlayer 72 can be actualized by means of the said flexible printed circuit board 81.

Specifically, the electrode conductors of the first underlayer 71 led out of the electrode layer 74 are electrically connected by the said electrode channel by means of the flexible printed circuit board 81 to said touch sensing controller module 93. Alternatively, said LCD touch screen also comprises the conductive contact 82 which is used for electrical connection between the first underlayer 71 and the second underlayer 72. The electrode conductors of the first underlayer 71 led out of the electrode layer 74 are electrically connected by the said electrode channel by means of the said conductive contacts 82 to the said LCD and touch sensor integration module 97.

The LCD touch screen of integrated monolayer capacitance sensor as described in this invention can be used for all equipments which can use or will use the liquid crystal display, so this invention also provides a LCD touch screen with integrated monolayer capacitance sensor, including the liquid crystal display. In particular, the said LCD is a LCD touch screen of integrated monolayer capacitance sensor, comprising the first underlayer 71, the second underlayer 72, the liquid crystal imaging material 73 installed between said first underlayer 71 and said second underlayer 72, and the control circuit. The said first underlayer 71 is provided with the color filter 711 and the said second underlayer 72 is furnished with the pixel electrode matrix 723. The said LCD touch screen of integrated monolayer capacitance sensor also comprises the capacitance touch sensor, which includes the electrode layer 74 installed between said first underlayer 71 and said second underlayer 72. The said electrode layer comprises the electrodes and the electrode conductors used for electrical connection of all electrodes, and said electrodes and electrode leads are installed in the same plane.

The said devices comprise desktop computer, portable computer, Tablet PC, mobile communication terminal, video playing device, audio playing device, video/audio playing device, GPS navigation equipment and electronic measurement equipment.

What is claimed is:

1. An LCD touch screen integrating single layer capacitive sensor, comprising first underlayer, second underlayer, liquid crystal imaging material which is set between the first underlayer and the second underlayer; color filter is set on the said first underlayer; pixel electrode matrix is set on the second underlayer, the pixel electrode matrix comprises pixel electrodes which are laid as matrix, each pixel electrode is provided with pixel electrode driving circuit; featuring that:
    it also comprises capacitive touch sensor, which comprises electrode layer set between the first underlayer and second underlayer; the electrode layer comprises electrodes and electrode conductors which are used for electric connection of various electrodes; and both of the electrodes and the electrode conductors are set in the same plane.

2. The LCD touch screen integrating single layer capacitive sensor according to claim 1 is characterized in that:
    a layer of black matrix for shielding all pixel electrode driving circuits of pixel electrode matrix is set on the first underlayer; and the black matrix comprises masking tapes;
    the electrode layer is set on the first underlayer, and covered by the black matrix, and all orthographic projections on the black matrix for both electrodes and electrode conductors in the electrode layer fall on the masking tapes of the black matrix.

3. The LCD touch screen integrating single layer capacitive sensor according to claim 2 is characterized in that:
    the capacitive touch sensor is based on the principle of mutual capacitance; the electrodes in the electrode layer comprise first electrodes and second electrodes which are made of conductive material, the electrode conductors comprise first connecting conductors which are made of conductive material and electrically connected to the first electrodes and second connecting conductors which are electrically connected to second electrodes;
    any of the first electrodes and second electrodes are placed in the display touch region of the LCD touch screen without overlapping each other; there is no positional relation of crossover, spanning and intersection between the first connecting conductors of the respective first electrodes, between second connecting conductors of the respective second electrodes, and between first connecting conductors and second connecting conductors in the touch region of the LCD touch screen.

4. The LCD touch screen integrating single layer capacitive sensor according to claim 1 is characterized in that:
    it also comprises flexible printed circuit board; and devices set on the underlayer are electrically connected to the devices set on the second underlayer by virtue of the flexible printed circuit board.

5. The LCD touch screen integrating single layer capacitive sensor according to claim 1 is characterized in that:
    it also comprises conductive contacts which are set between the first underlayer and second underlayer; and devices set on the first underlayer are electrically connected to the devices set on the second underlayer by virtue of the conductive contacts.

6. The LCD touch screen integrating single layer capacitive sensor according to claim 1 is characterized in that:
    it also comprises two polaroids which respectively cover the first underlayer and second underlayer.

7. The LCD touch screen integrating single layer capacitive sensor according to claim 1 is characterized in that:
    the control circuit comprises main control module, LCD and touch sensor integration module which are electrically connected to the main control module;
    the control circuit also comprises gate drive module and source drive module which are respectively electrically connected to the LCD and touch sensor integration module, as well as the pixel activation module which is electrically connected to the gate drive module and source drive module;
    the control circuit also comprises the electrode channel which is electrically connected to the LCD and touch sensor integration module; and the electrode channel is electrically connected by the electrode groups inside of the electrode layer.

8. The LCD touch screen integrating single layer capacitive sensor according to claim 7 is characterized in that:
    area of the second underlayer is larger than that of the first underlayer, the second underlayer comprises display touch area which is over against the first underlayer, and the epitaxial region which is extended outward from the display touch area;
    the gate drive module, source drive module and pixel activation module are set at the display touch area of the second underlayer; the LCD and touch sensor integration module (97) is set at the epitaxial region of the second underlayer; and the electrode channel is set inside of the electrode layer on the first underlayer.

9. The LCD touch screen integrating single layer capacitive sensor according to claim 7 is characterized in that:
    the first underlayer led out by the electrode layer is electrically connected to the LCD and touch sensor integration module by the electrode channel by virtue of the flexible PCB.

10. The LCD touch screen integrating single layer capacitive sensor according to claim 7 is characterized in that:
    it also comprises the conductive contacts which are used for electrical connection between the first underlayer and the second underlayer; and the electrode conductors of the first underlayer led out from the electrode layer are electrically connected to the said LCD and touch sensor integration module by the electrode channel by virtue of the conductive contacts.

11. The LCD touch screen integrating single layer capacitive sensor according to claim 7 is characterized in that:

the capacitive touch sensor is based on the principle of mutual capacitance, the electrode channel comprises the drive electrode channel which is electrically connected by the drive electrode groups and the sensor electrode channel which is electrically connected by the sensor electrode groups.

12. An LCD touch screen device provided with integrated single layer capacitive sensor, comprising LCD, features that:

the LCD is the LCD touch screen integrating single layer capacitive sensor, comprising the first underlayer, the second underlayer and liquid crystal imaging material which is set between the first underlayer and the second underlayer, as well as the control circuit; a color filter is set on the first underlayer; and pixel electrode matrix is set on the second underlayer;

the LCD touch screen integrating single layer capacitive sensor also comprises capacitive touch sensor, which comprises an electrode layer which is set between the first underlayer and second underlayer; the electrode layer comprises electrodes and electrode conductors which are used for electric connection of various electrodes; and both of the electrodes and the electrode conductors are set in the same plane.

13. The LCD touch screen device provided with integrated single layer capacitive sensor according to claim 12 is characterized in that:

the device comprises desktop computer, portable computer, Tablet PC, mobile communication terminal, video playback device, audio playback device, video/audio playback device, GPS navigation equipment and electronic measuring equipment.

\* \* \* \* \*